(12) United States Patent
Tonami et al.

(10) Patent No.: US 9,081,105 B2
(45) Date of Patent: Jul. 14, 2015

(54) RADIATION DETECTOR

(71) Applicant: SHIMADZU CORPORATION, Kyoto-shi, Kyoto (JP)

(72) Inventors: Hiromichi Tonami, Kyoto-fu (JP); Tomoaki Tsuda, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 14/285,346

(22) Filed: May 22, 2014

(65) Prior Publication Data

US 2014/0346363 A1 Nov. 27, 2014

(30) Foreign Application Priority Data

May 23, 2013 (JP) ................................. 2013-109223

(51) Int. Cl.
*G01T 1/20* (2006.01)
*G01T 1/202* (2006.01)

(52) U.S. Cl.
CPC ............... *G01T 1/2002* (2013.01); *G01T 1/202* (2013.01)

(58) Field of Classification Search
CPC ... G01T 1/1644; G01T 1/1647; G01T 1/2928; G01T 1/2985; G01T 1/2018; G01T 1/202; G01T 1/243; G01T 1/244; G01T 1/1642; G01T 1/20; G01T 1/2008; G01T 1/1648; G01T 1/2002; G01T 3/06
USPC ........................................................ 250/368
See application file for complete search history.

(56) References Cited

U.S. PATENT DOCUMENTS

| | | | |
|---|---|---|---|
| 2004/0178347 A1* | 9/2004 | Murayama et al. | 250/367 |
| 2005/0087693 A1* | 4/2005 | Sumiya et al. | 250/367 |
| 2007/0040125 A1* | 2/2007 | Sato et al. | 250/367 |
| 2010/0155610 A1* | 6/2010 | Menge et al. | 250/368 |
| 2010/0308227 A1* | 12/2010 | Tonami et al. | 250/363.02 |
| 2010/0320389 A1* | 12/2010 | Tonami et al. | 250/361 C |
| 2011/0056618 A1* | 3/2011 | Tonami | 156/242 |
| 2011/0121184 A1* | 5/2011 | Inadama et al. | 250/361 R |
| 2012/0056104 A1* | 3/2012 | Perna | 250/486.1 |
| 2015/0028218 A1* | 1/2015 | Kataoka et al. | 250/367 |

FOREIGN PATENT DOCUMENTS

| | | |
|---|---|---|
| JP | 2004-279057 A | 10/2004 |
| WO | 2009/101730 A1 | 8/2009 |

* cited by examiner

*Primary Examiner* — David J Makiya
*Assistant Examiner* — Taeho Jo
(74) *Attorney, Agent, or Firm* — McDermott Will & Emery LLP

(57) ABSTRACT

A radiation detector includes two reflecting plate lattices that are combined into a single reflecting plate lattice. The use of such a structure simplifies the manufacturing of a scintillator. The radiation detector reduces the number of reflecting plate lattices that are stacked when manufacturing the scintillator, enabling the scintillator to be manufactured easily. Moreover, the number of reflecting plate lattices to be manufactured is reduced, reducing commensurately the number of components required for manufacturing the scintillator. The scintillator may be manufactured more easily and an inexpensive radiation detector may be obtained.

10 Claims, 10 Drawing Sheets

RADIATION DETECTOR

CROSS-REFERENCE TO RELATED APPLICATION

The present application claims priority from Japanese patent application No. 2013-109223 filed on May 23, 2013, the entire contents of which are hereby incorporated by reference.

TECHNICAL FIELD

The present disclosure relates to a radiation detector wherein scintillator crystals are arranged in three dimensions, and, in particular, relates to a radiation detector provided with reflecting plates for discriminating florescent light emission locations in the depth direction.

BACKGROUND

Some radiation detectors for detecting radiation such as gamma rays look like that which is shown in FIG. 21. Such a radiation detector 51 has a scintillator 52 wherein scintillator crystals c are arranged three-dimensionally in the length, width, and height directions, and a photodetector 53 for detecting fluorescence emitted from the scintillator 52. The fluorescence that is emitted by the scintillator 52 is that which has been converted from radiation (see, for example, Japanese Unexamined Patent Application Publication 2004-279057).

The radiation detector 51 has a function for discriminating the part of the scintillator 52 that emitted the fluorescence when fluorescence is measured. Such a function is known as a fluorescence location discriminating function. The radiation detector 51 identifies the location of the fluorescence by identifying which of the scintillator crystals c that structure the scintillator 52 emitted the fluorescence.

If the scintillator 52 were structured by simply arranging the scintillator crystals c, accurate fluorescence location discrimination would not be possible. In particular, it is necessary to provide reflecting plates 54 for reflecting the fluorescence in gaps between the crystals that structure the scintillator 52 in order to be able to discriminate which of the crystals, arranged in the height direction, indicated by the shading in FIG. 21, was the crystal that emitted the fluorescence.

The structure of the reflecting plates 54 will be explained. There are two sets of reflecting plates 54, those extending in the crosswise direction and those extending in the lengthwise direction, each having the same height as the crystals. The reflecting plates 54 that extend in the crosswise direction and the reflecting plates 54 that extend in the lengthwise direction are fitted together so that the reflecting plates 54 structure a grid-shaped reflecting plate lattice. The crystals are arranged so as to fit into the reflecting plate lattice. FIG. 22 illustrates the reflecting plate lattice schematically.

The scintillator 52 of a conventional radiation detector 51 is structured by stacking, in the height direction, scintillator crystal layers wherein scintillator crystals c are arranged in the lengthwise and crosswise directions by fitting the crystals into reflecting plate lattices. When manufacturing this type of scintillator 52, the number of reflecting plate lattices must equal the number of layers of scintillator crystals. For example, manufacturing the scintillator 52 of FIG. 21, which has four scintillator crystal layers, requires four reflecting plate lattices.

However, in recent years a scintillator 52 of a new structure has been developed. Specifically, it is a scintillator 52 wherein the crystals c in FIG. 21 are monolithic in the height direction, as illustrated in FIG. 23. The use of such a scintillator 52 improves the sensitivity of the radiation detector 51. Unlike the structure that has four layers of scintillator crystals as shown in FIG. 21, with the scintillator 52 of FIG. 23, the fluorescence is able to arrive reliably at the photodetector 53 (see, for example, International Patent Application Publication WO 2009/101730).

Such a scintillator 52, explained using FIG. 23, is also provided with four reflecting plate lattices that are structured from reflecting plates 54. The reflecting plate lattices enable the radiation detector 51 to discriminate the location of the emission of the fluorescence for the vertical direction.

However, the conventional radiation detector has problems. Specifically, the conventional radiation detector 51 is difficult to manufacture.

That is, in order to manufacture the conventional scintillator 52 it is necessary to stack four reflecting plate lattices in the height direction and then to load the scintillator crystals into the openings in the reflecting plate lattices. The reflecting plate lattices are structured from rectangular reflecting plates, and are flexible. Stacking four such flexible reflecting plate lattices is not easy. Consequently, manufacturing a scintillator 52 with the conventional structure requires rather complex operations. If the scintillator 52 is difficult to manufacture, the manufacturing cost of the radiation detector 51 is commensurately higher.

Moreover, with the conventional scintillator 52, four individual reflecting plate lattices must be prepared. When the reflecting plate lattices must be manufactured individually, the number of components for structuring the reflecting plate lattices is increased commensurately, and more labor is required when manufacturing the reflecting plate lattices. This labor further complicates the manufacturing of the scintillator 52, resulting in a commensurate increase in the manufacturing cost of the radiation detector 51.

SUMMARY

The present application is the result of contemplation on such a situation, and the object thereof is to provide a radiation detector that can be manufactured easily.

In order to solve the problems set forth above, the subject matter according to the present disclosure has structures such as the following. The radiation detector according to the present disclosure is a radiation detector provided with a scintillator wherein scintillator crystals for converting radiation into the fluorescence are arranged in the crosswise and lengthwise directions, and wherein there are four layers, a first layer through a fourth layer, in the height direction. A plurality of reflecting plates extend in the crosswise direction or the lengthwise direction, for reflecting the fluorescence, in the gaps between mutually adjacent scintillator crystals. Reflecting plates that extend in the crosswise direction are arranged in the lengthwise direction with spacing equal to the size of one scintillator crystal so as to alternate between the first layer and the second layer of the scintillator. Reflecting plates that extend in the lengthwise direction are arranged spanning the first layer and the second layer of the scintillator and with spacing equal to the size of two scintillator crystals in the crosswise direction. The reflecting plates that extend in the crosswise direction and the reflecting plates that extend in the lengthwise direction are fitted together to structure a reflecting plate lattice that has the same height as two layers of the scintillator.

Moreover, in the radiation detector as set forth in the present disclosure, the third layer and fourth layer of the scintillator may also use this same structure. Moreover, the radiation detector according to the present disclosure may use the same structure for the third layer and the fourth layer of the scintillator as well. That is, preferably, the radiation detector set above, further comprises: a plurality of reflecting plates that extend in the crosswise direction and the lengthwise direction in the third layer and the fourth layer of the scintillator as well. Reflecting plates that extend in the crosswise direction are arranged in the lengthwise direction with spacing equal to the size of one scintillator crystal so as to alternate between the third layer and the fourth layer of the scintillator. Reflecting plates that extend in the lengthwise direction are arranged spanning the third layer and the fourth layer of the scintillator and with spacing equal to the size of two scintillator crystals in the crosswise direction. The reflecting plates that extend in the crosswise direction and the reflecting plates that extend in the lengthwise direction are fitted together to structure a reflecting plate lattice that has the same height as two layers of the scintillator.

Given the structure in the present disclosure, that which is two reflecting plate lattices in the conventional structure is combined to form a single reflecting plate lattice. The use of such a structure simplifies the manufacturing of the scintillator. That is, in the radiation detector according to the present disclosure, the number of reflecting plate lattices that must be stacked when manufacturing the scintillator is reduced, making the scintillator easy to manufacture. Moreover, the number of scintillator plate lattices that require manufacturing is small, reducing also the number of parts required when manufacturing the scintillator. Consequently, the subject matter according to the present disclosure makes it possible to provide an inexpensive radiation detector, wherein the scintillator can be manufactured more easily than with the conventional structure.

Furthermore, given the present disclosure, two reflecting plate lattices are combined together. There is no leeway for positional misalignment between the reflecting plate lattices that have been integrated together. Consequently, the subject matter according to the present disclosure enables structuring of a scintillator wherein the reflecting plate lattices are positioned more precisely, enabling the provision of a radiation detector with higher detection accuracy.

Moreover, the subject matter of the present disclosure makes it possible to insert the scintillator crystals easily into the reflecting plate lattices when manufacturing the scintillator. This is because the integration of the reflecting plate lattices keeps the scintillator crystals from catching at the joints between reflecting plate lattices.

Furthermore, the subject matter according to the present disclosure enables the structuring of a reflecting plate lattice having ideal reflection characteristics. This is because the integration of the reflecting plate lattices does not produce a phenomenon wherein the fluorescence is not reflected at the joints between reflecting plate lattices.

Moreover, preferably, in a radiation detector as set forth above, slots that extend in the height direction are provided in the reflecting plates that extend in the crosswise direction and the reflecting plates that extend in the lengthwise direction. The reflecting plate lattice is structured so that the slots provided in the reflecting plates that extend in the crosswise direction and the slots in the reflecting plates that extend in the lengthwise direction fit together.

The structure described above illustrates a more specific structure for the radiation detector according to the present disclosure. Structuring the reflecting plate lattice by fitting together slots that are provided in the reflecting plates that extend in the crosswise direction and slots that are provided in the reflecting plates that extend in the lengthwise direction enables the reflecting plate lattice to be structure more reliably.

Moreover, preferably, in a radiation detector as set forth above, notches into which the reflecting plates that extend in the crosswise direction in the third layer of the scintillator are inserted, are provided in the reflecting plates that extend in the lengthwise direction that are provided spanning the first layer and the second layer of the scintillator.

Moreover, preferably, in a radiation detector as set forth above, notches into which the reflecting plates that extend in the crosswise direction in the second layer of the scintillator are inserted, are provided in the reflecting plates that extend in the lengthwise direction that are provided spanning the third layer and the fourth layer of the scintillator.

Moreover, preferably, in a radiation detector as set forth above, notches into which the reflecting plates that extend in the crosswise direction and that span the third layer and the fourth layer of the scintillator are inserted, are provided in the reflecting plates that extend in the lengthwise direction that are provided in the second layer of the scintillator.

Moreover, preferably, in a radiation detector as set forth above, notches into which the reflecting plates that extend in the crosswise direction and that span the first layer and the second layer of the scintillator are inserted, are provided in the reflecting plates that extend in the lengthwise direction that are provided in the third layer of the scintillator.

The structure described above illustrates a more specific structure for the radiation detector according to the present disclosure. So that there will be no misalignment between the two reflecting plate lattices that are provided in the scintillator, the provision, in one of the reflecting plate lattices, of notches into which the other reflecting plate lattice fits makes it easier to insert the scintillator crystals when manufacturing the scintillator.

Moreover, preferably, in a radiation detector as set forth above, the scintillator crystals are provided spanning the first layer through the fourth layer of the scintillator.

Moreover, preferably, in a radiation detector as set forth above, the scintillator crystals are provided separately in the first layer through the fourth layer of the scintillator.

The subject matter according to the present disclosure can be applied to scintillators of various types.

Moreover, preferably, a radiation detector as set forth above further comprises a photodetector for detecting fluorescence, connected optically to the scintillator.

The structure described above illustrates a more specific structure for the radiation detector according to the present disclosure. The provision of the photo detector enables the fluorescence to be detected more reliably.

In the structure according to the present disclosure, that which is two reflecting plate lattices in the conventional structure is combined together to form one reflecting plate lattice. The use of such a structure makes manufacturing of the scintillator easy. That is, the radiation detector according to the present disclosure reduces the number of reflecting plate lattices to be stacked when manufacturing the scintillator, enabling the scintillator to be manufactured easily.

Furthermore, the number of reflecting plate lattices that must be manufactured is reduced, reducing commensurately the number of parts required when manufacturing the scintillator. As a result, the subject matter according to the present disclosure enables the scintillator to be manufactured more easily than with the conventional structure, enabling the provision of an inexpensive radiation detector.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTIONS OF THE DRAWINGS

The drawing figures depict one or more implementations in accord with the present teachings, by way of example only, not by way of limitation. In the figures, like reference numerals refer to the same or similar elements.

Figure 1:
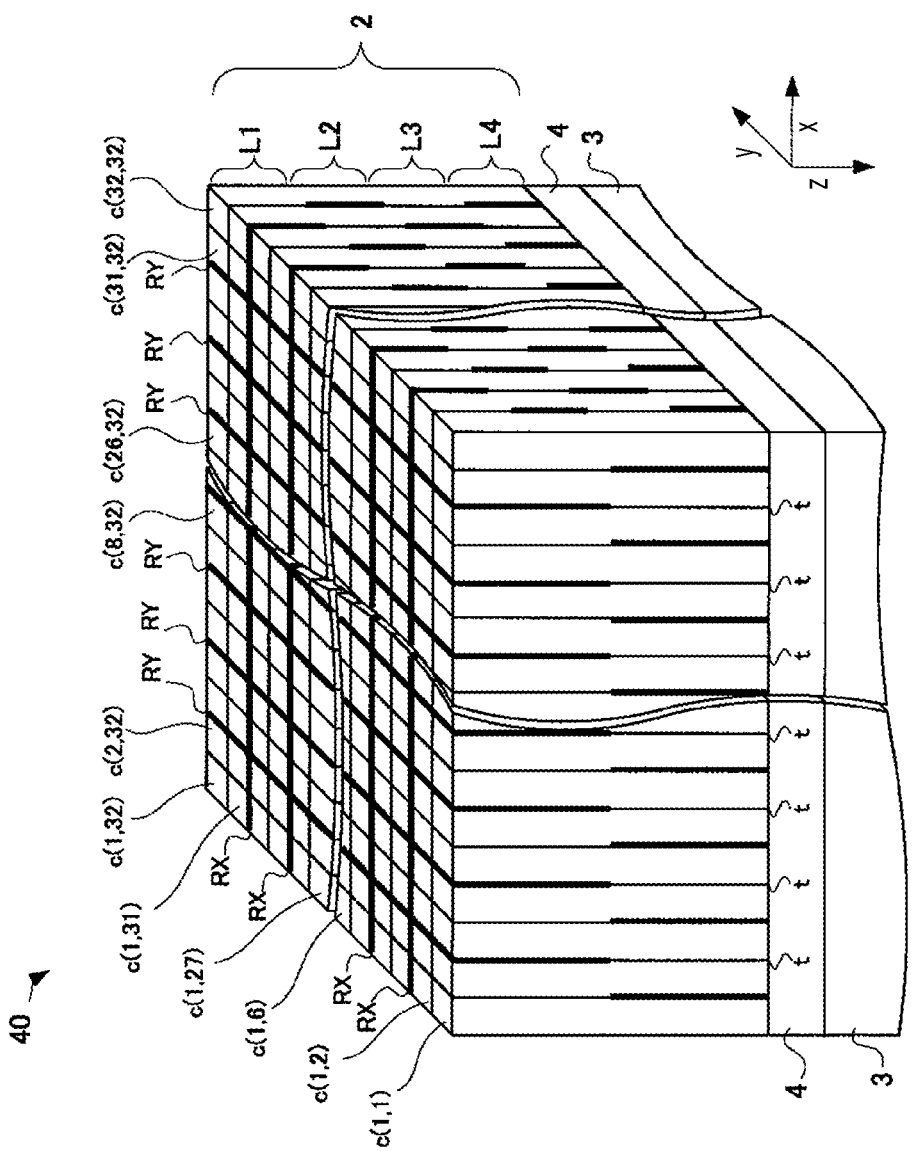
FIG. 1 is a perspective diagram for explaining the structure of a radiation detector according to a first embodiment.
Figure 5:
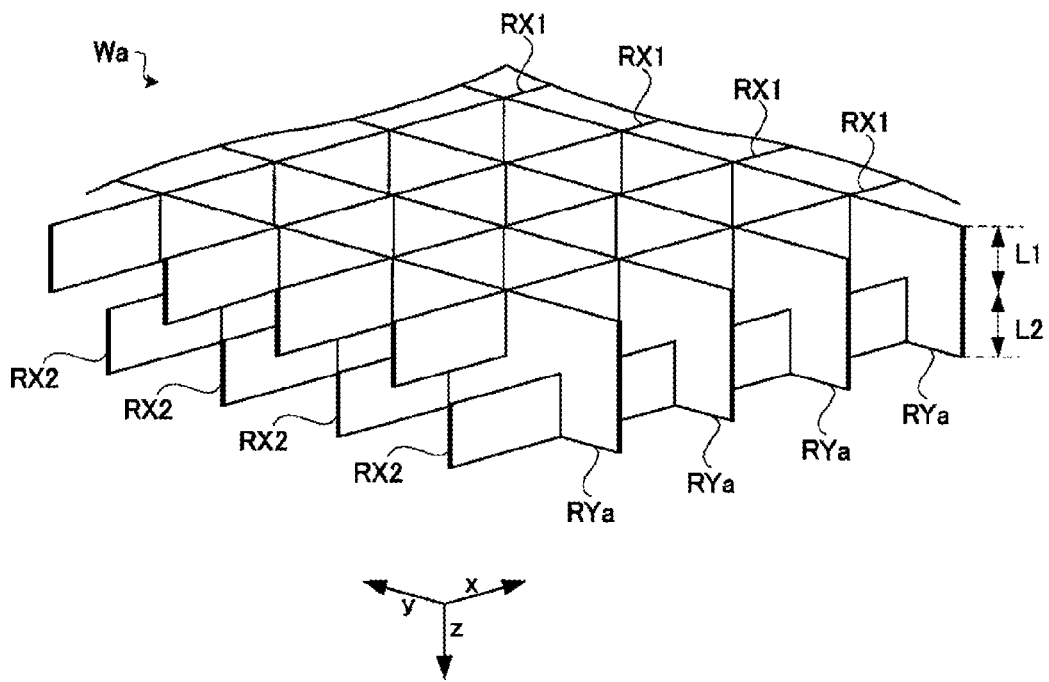
Figure 6:
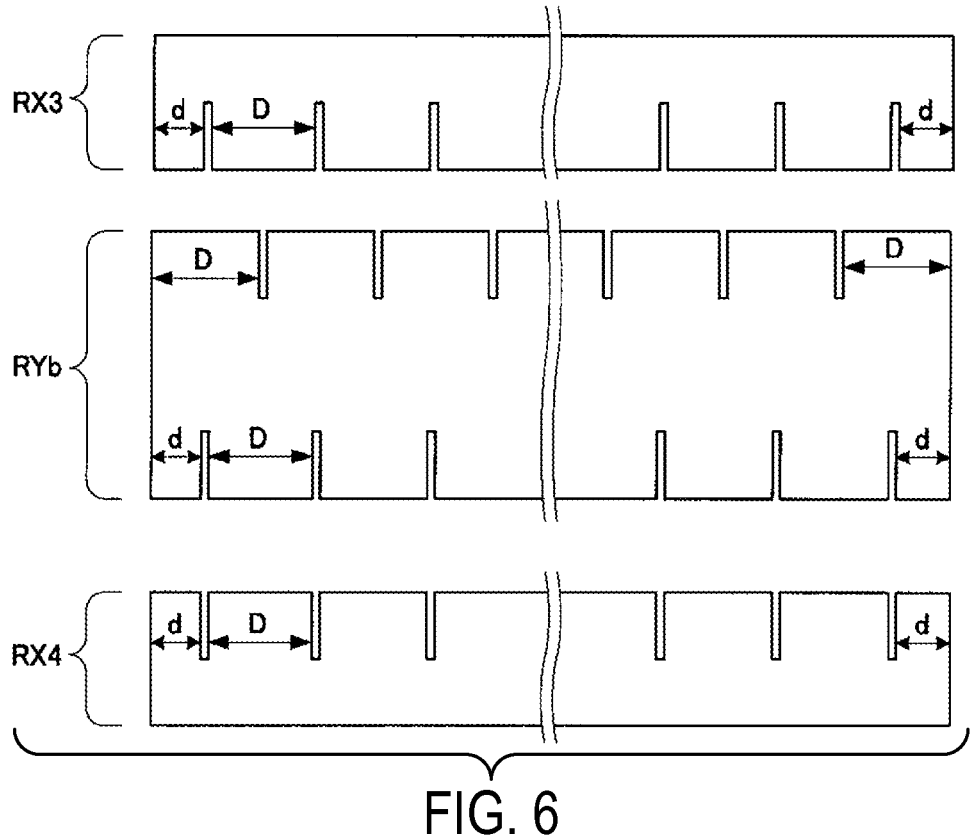
Figure 7:
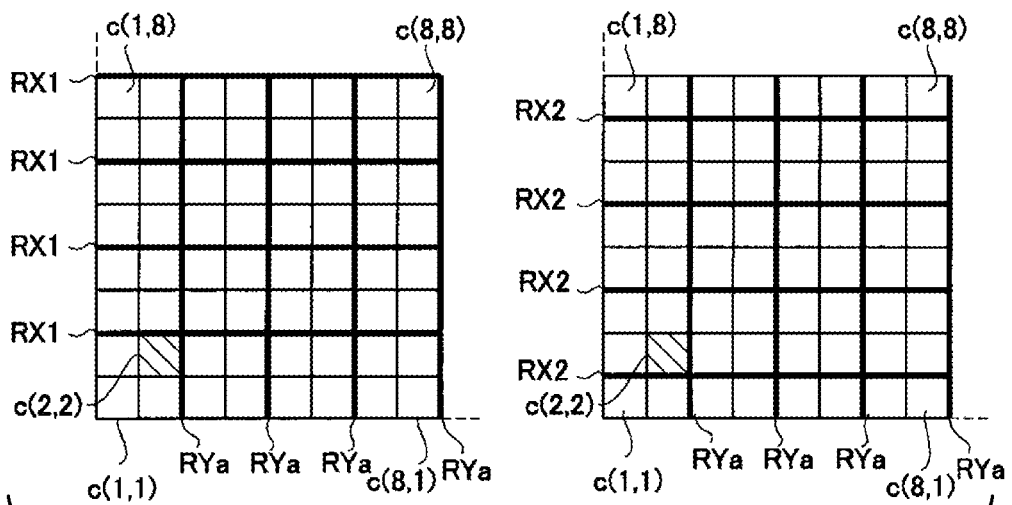
Figure 8:
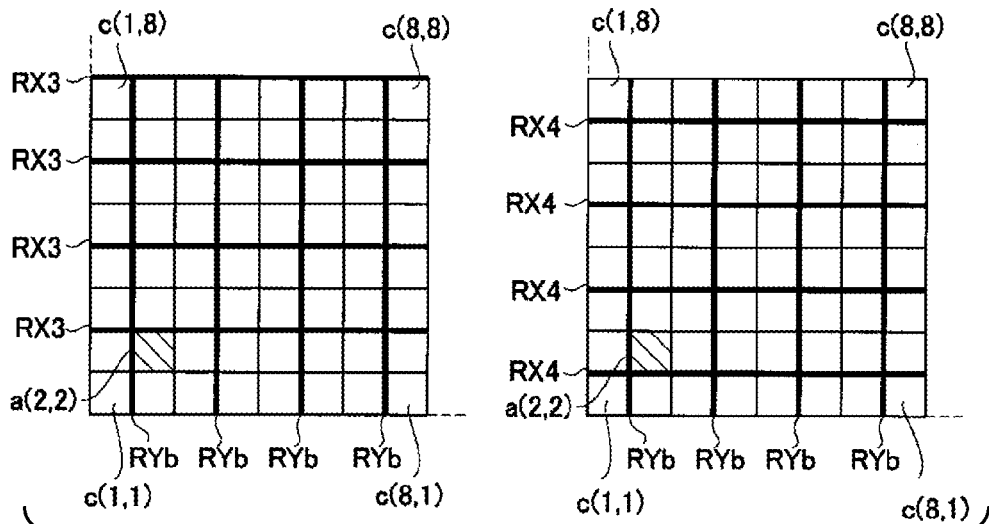
Figure 9:
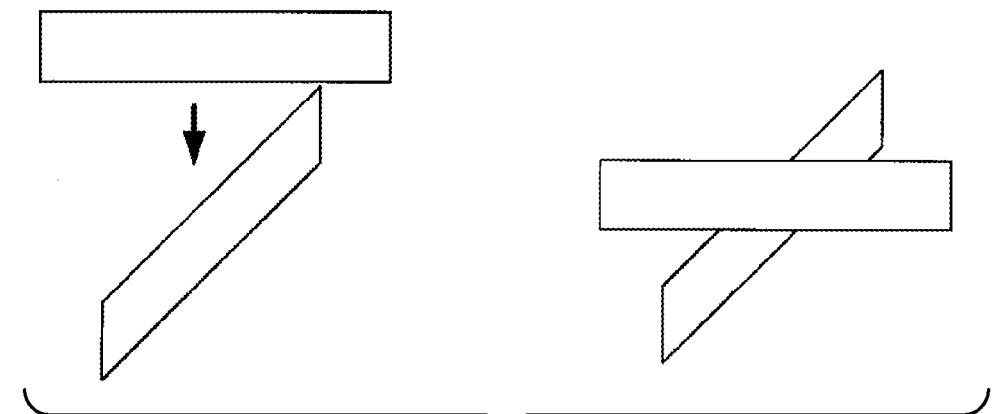
Figure 10:
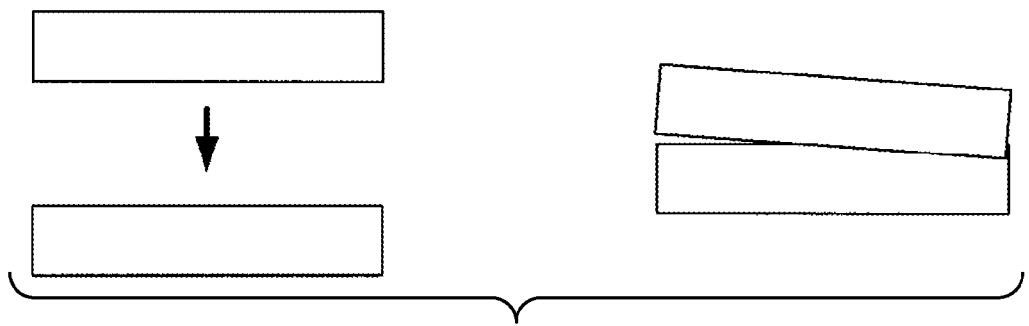
Figure 11:
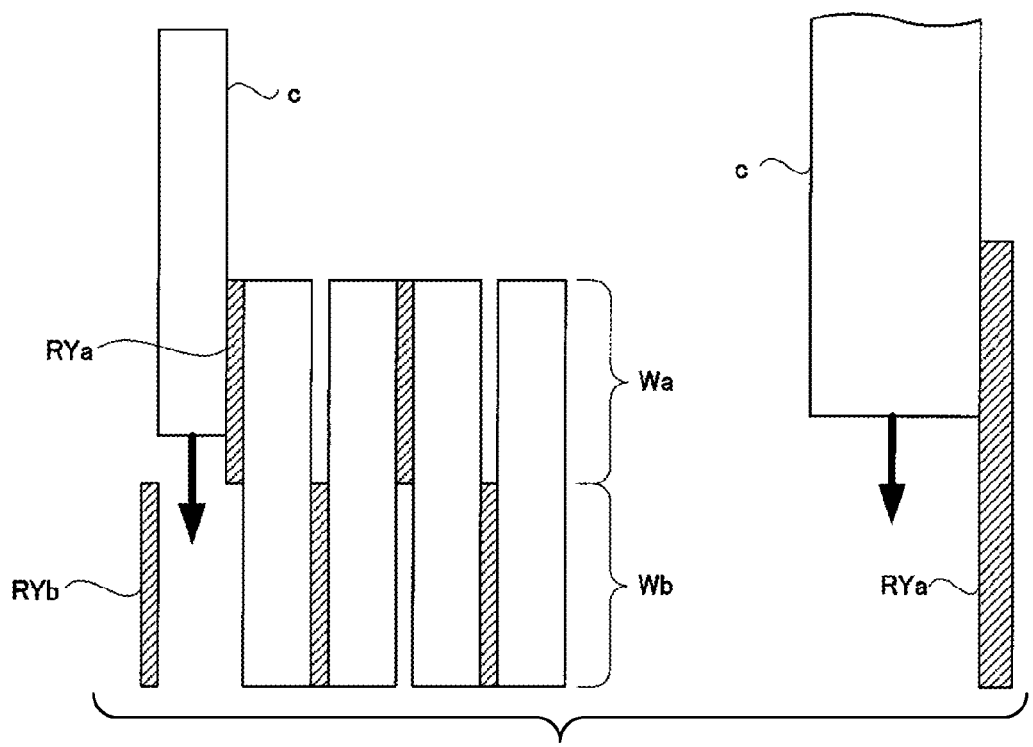
Figure 12:
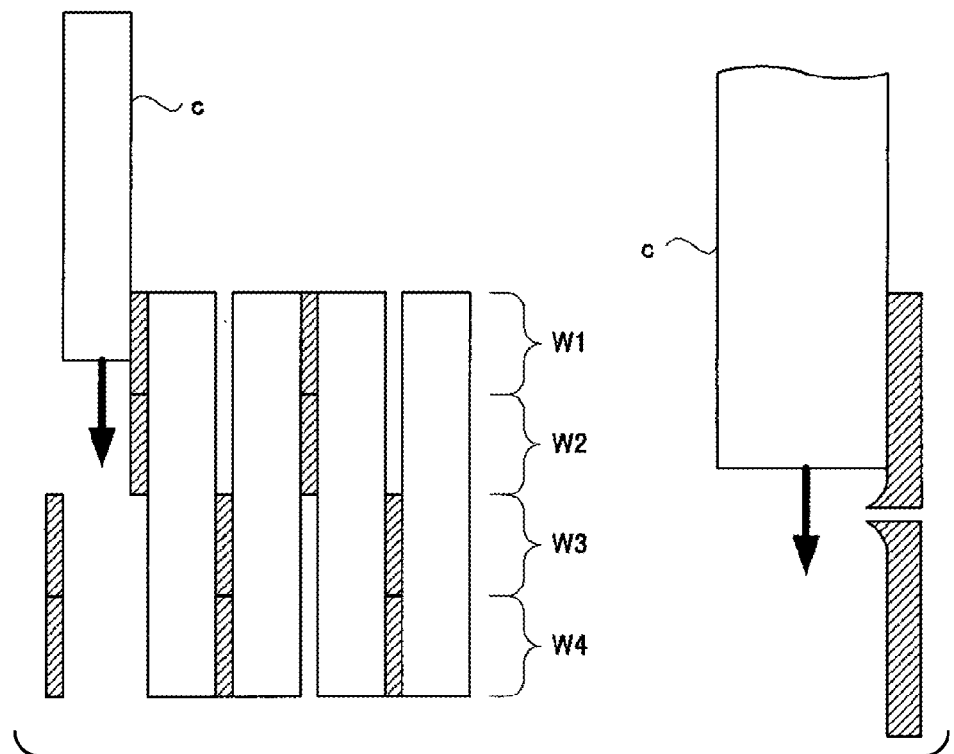
Figure 13:
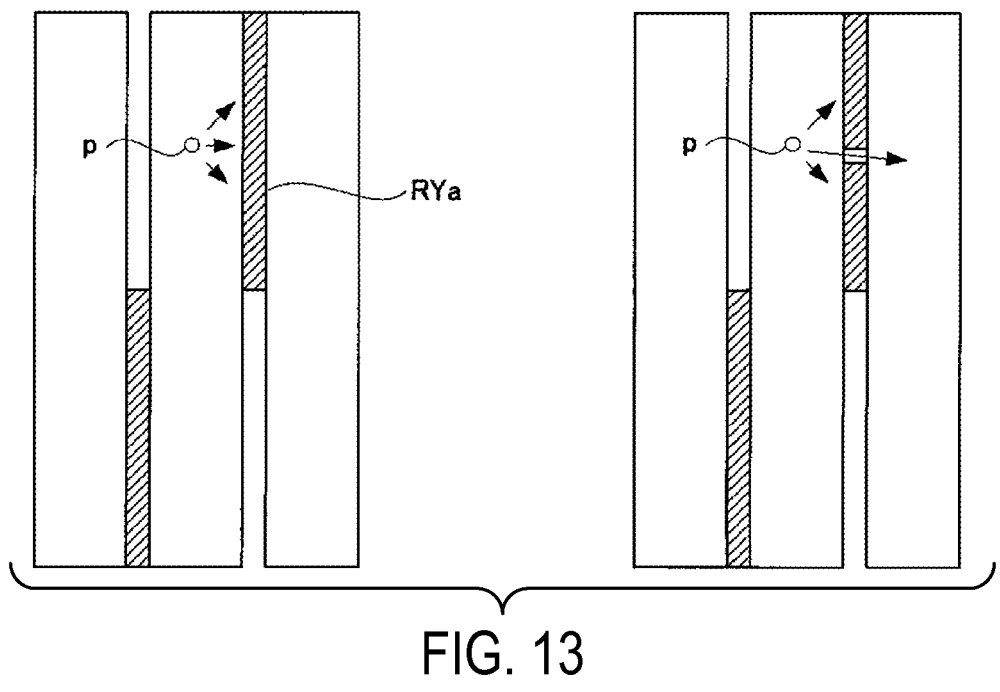
Figure 14:
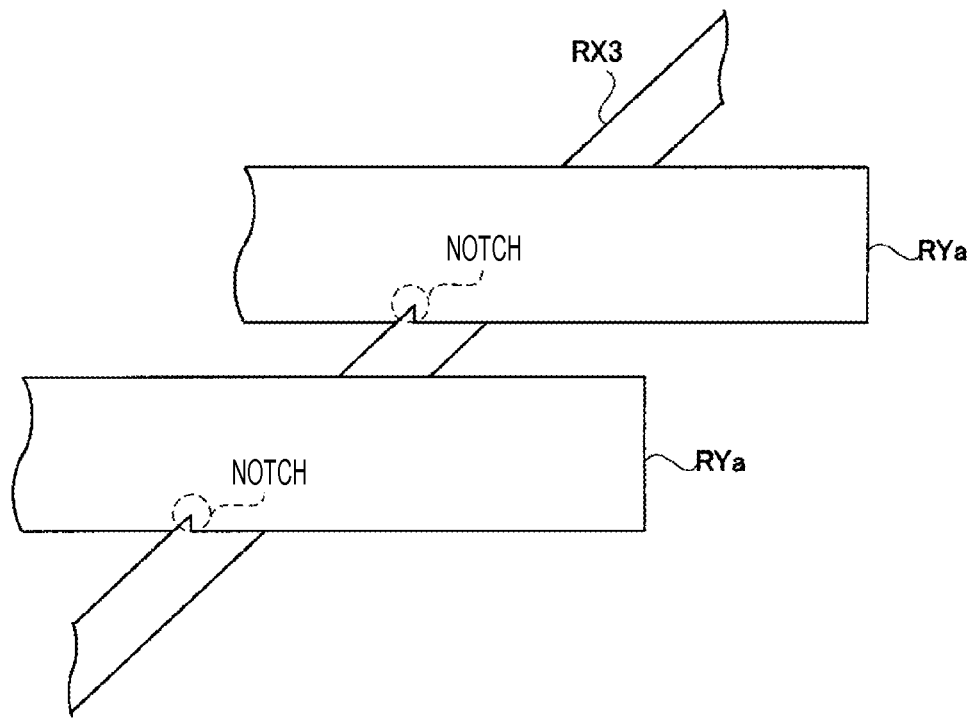
Figure 15:
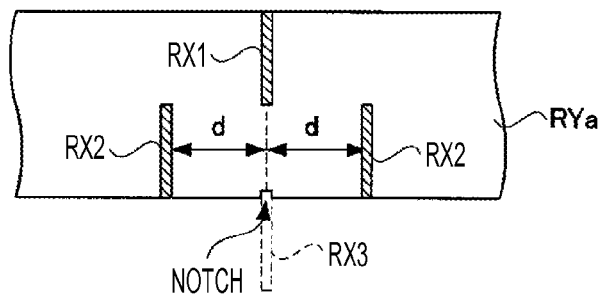
Figure 16:
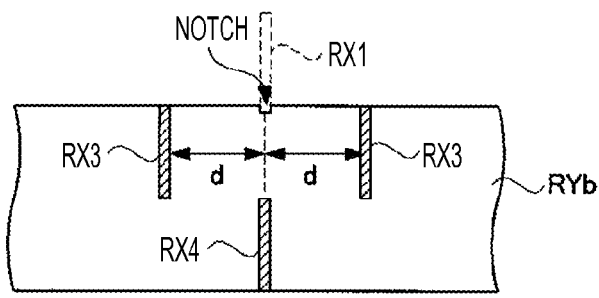
Figure 17:
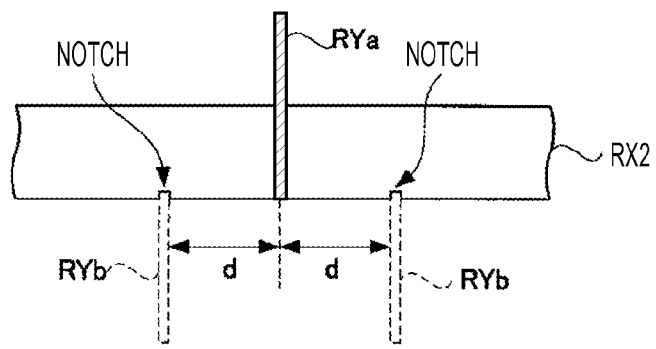
Figure 18:
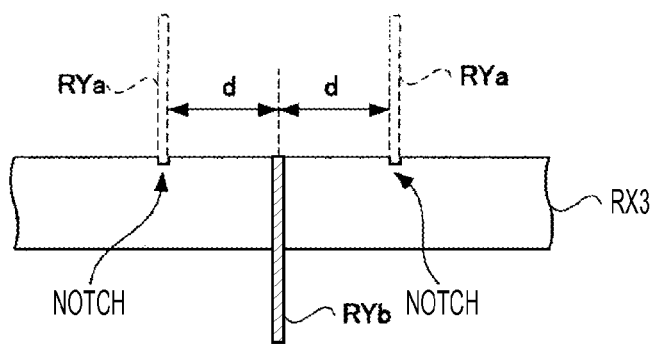
Figure 19:
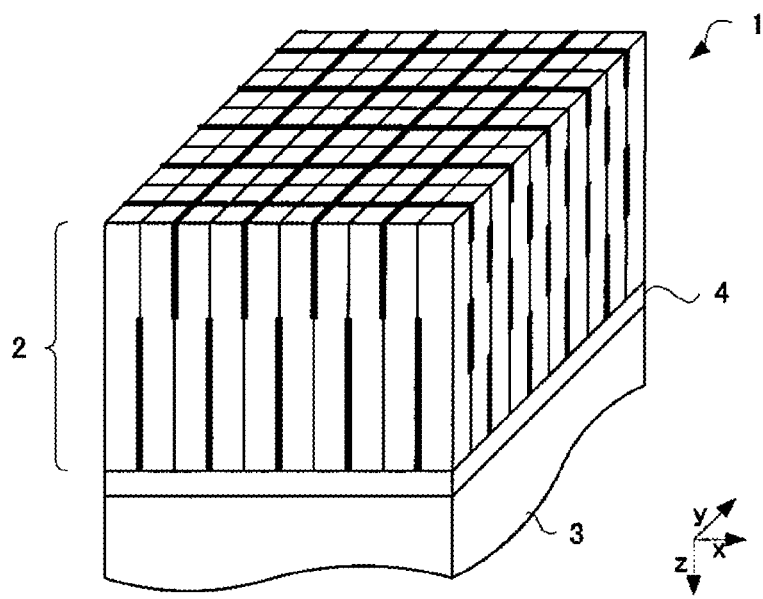
Figure 20:
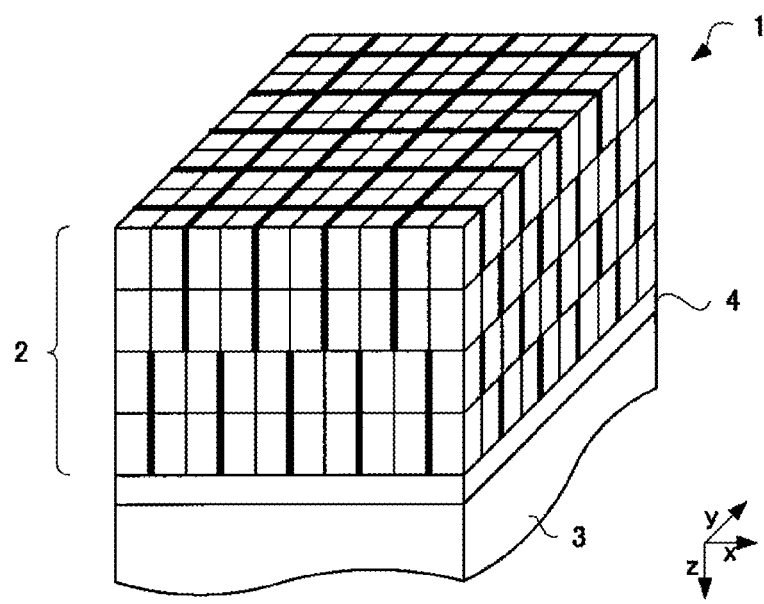
Figure 21:
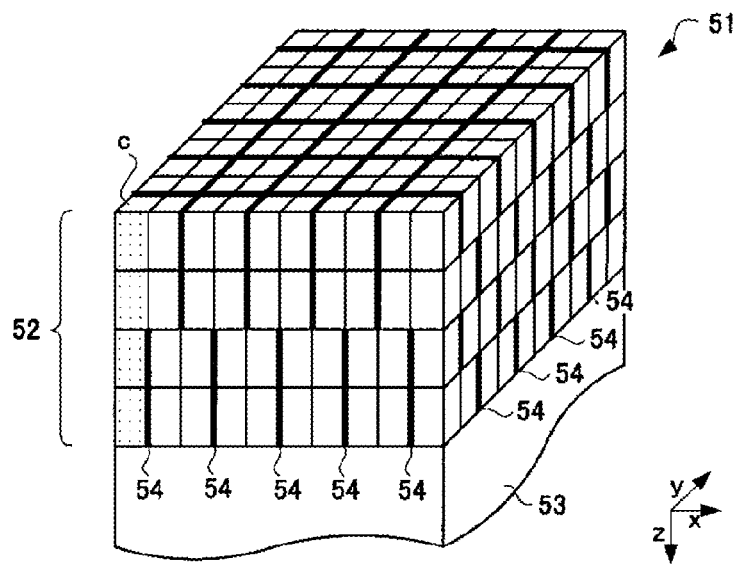
Figure 22:
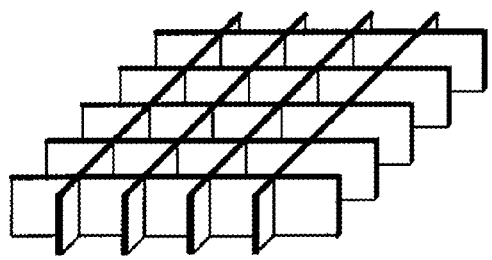

FIG. 5 FIG. 1 is a perspective diagram for explaining the structure of a reflecting plate lattice according to the first embodiment;

FIG. 6 is a plan view diagram for explaining the structure of a reflecting plate according to the first embodiment;

FIG. 7 is a schematic diagram for explaining the principle for discriminating the location of the emission of the fluorescence for the height direction according to the first embodiment;

FIG. 8 is a schematic diagram for explaining the principle for discriminating the location of the emission of the fluorescence for the height direction according to the first embodiment;

FIG. 9 is a schematic diagram for explaining the effects of the structure according to the first embodiment;

FIG. 10 is a schematic diagram for explaining the effects of the structure according to the first embodiment;

FIG. 11 is a schematic diagram for explaining the effects of the structure according to the first embodiment;

FIG. 12 is a schematic diagram for explaining the effects of the structure according to the first embodiment;

FIG. 13 is a schematic diagram for explaining the effects of the structure according to the first embodiment;

FIG. 14 is a schematic diagram for explaining one modified example according to the present disclosure;

FIG. 15 is a schematic diagram for explaining one modified example according to the present disclosure;

FIG. 16 is a schematic diagram for explaining one modified example according to the present disclosure;

FIG. 17 is a schematic diagram for explaining one modified example according to the present disclosure;

FIG. 18 is a schematic diagram for explaining one modified example according to the present disclosure;

FIG. 19 is a schematic diagram for explaining one modified example according to the present disclosure;

FIG. 20 is a schematic diagram for explaining one modified example according to the present disclosure;

FIG. 21 is a perspective diagram for explaining a conventional structure;

FIG. 22 is a perspective diagram for explaining a conventional structure; and

Figure 23:
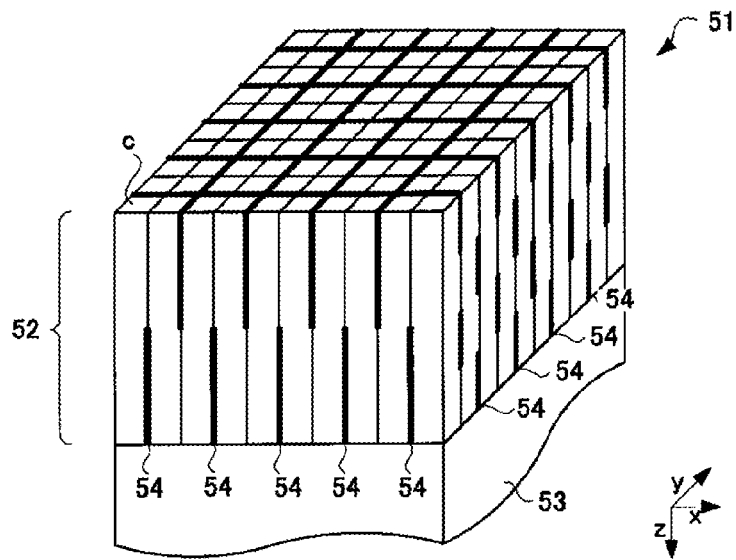

FIG. 23 is a perspective diagram for explaining a conventional structure.

DETAILED DESCRIPTION

First Embodiment (1) Overall Structure of the Radiation Detector 1

As illustrated in FIG. 1, a radiation detector 1 according to a first embodiment comprises a scintillator 2 for converting radiation into fluorescence; a photomultiplier tube (hereinafter termed a "PMT"), provided on the bottom face of the scintillator 2, for detecting fluorescence emitted from the scintillator 2; and a light guide 4, disposed at a location interposed between the scintillator 2 and the PMT 3. The PMT 3 is of a multi-anode type, able to discriminate the location of the incident fluorescence for x and y (the crosswise and lengthwise location). The light guide 4 is provided for guiding, to the PMT 3, the fluorescence that is emitted by the scintillator 2. Consequently, the light guide 4 is optically coupled to the scintillator 2 and the PMT 3. The PMT 3 corresponds to the photodetector in the present disclosure.

(2) Structure of the Scintillator

The scintillator 2 is structured through arranging, two-dimensionally, in the x and y directions, scintillator crystals c for converting radiation into fluorescence, and has four layers, a first layer L1 through a fourth layer L4, in the z direction. That is, the scintillator 2 is structured through arranging, two-dimensionally, scintillator crystals c that are of square column shapes that are long and thin, extending in the z direction (the height direction). Each individual scintillator crystal c is structured from $Lu_{2(1-X)}Y_{2X}SiO_5$ into which Ce has been diffused (hereinafter termed "LYSO"). Moreover, each individual scintillator crystal c is a rectangular solid that measures, for example, 1.45 mm in the x direction, 1.45 mm in the y direction, and 18 mm in the z direction. Moreover, the four side faces of the scintillator 2 are coated with a reflective coating, not shown. Each scintillator crystal c is provided spanning from the first layer L1 through the fourth layer L4 of the scintillator 2.

Note that the fluorescence that is emitted from the scintillator 2 is identified by the PMT 3 that detects fluorescence, connected optically to the scintillator 2 through the light guide 4. That is, the PMT 3 is able to identify which scintillator crystal c produced the fluorescence that is emitted from the scintillator 2. That is, the PMT 3 has a fluorescence emission location discriminating function for the x direction and the y direction of the scintillator 2.

The PMT 3 is able to discriminate the fluorescence emission location for the z direction of the scintillator 2 as well. That is, the PMT 3 is able to discriminate which of the four layers of the scintillator 2 it was that emitted the fluorescence. That is, the scintillator 2 can be classified into four regions in the z direction. The classifications at this time are termed, sequentially, the first layer L1, the second layer L2, the third layer L3, and the fourth layer L4. Of these four layers, the layer that is positioned on the incident face side that is the face of the scintillator 2 on which the radiation is incident is the first layer L1, and the layer that is positioned on the side of the scintillator 2 where the light guide 4 is the fourth layer L4. The scintillator crystals c that structure the scintillator 2 exist extending over these layers L1, L2, L3, and L4. The z-direction lengths of the individual layers L1, L2, L3, and L4 are set to 4.5 mm each.

Transparent materials t through which fluorescence passes are provided at positions interposed between mutually adjacent scintillator crystals c. The transparent materials t are formed also between the scintillator crystals c and the reflecting plates RX and RY. The transparent material t also fulfills the role of forming the scintillator 2 by coupling the scintillator crystals c and the reflecting plates. The thickness of the transparent material t is about 25 μm between the scintillator crystal c and the reflecting plates RX and RY, where thermally curable resin made from a silicone resin can be used as the material.

(3) Structure of the Reflecting Plates

Figure 2:
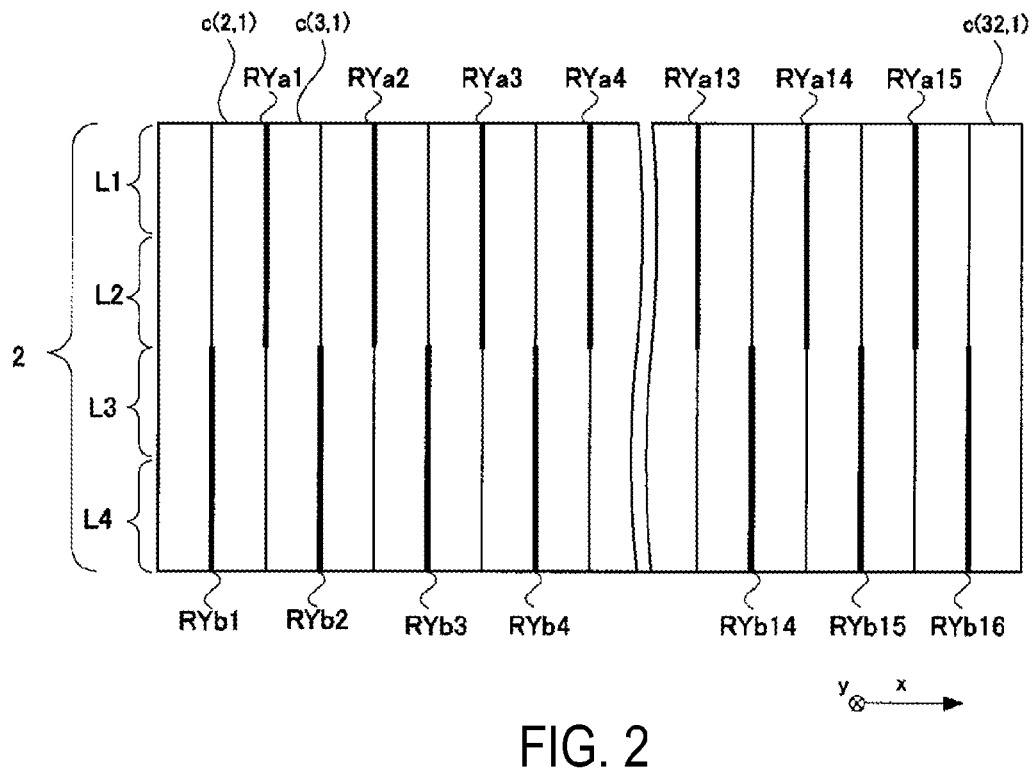
FIG. 2 is a plan view diagram for explaining the structure of a scintillator according to the first embodiment.

The structure of the reflecting plate will be explained next. The scintillator 2 is provided with reflecting plates RX that extend in the x direction (the crosswise direction), and reflecting plates RY that extend in the y direction (the lengthwise direction), for reflecting the fluorescence, in the gaps between mutually adjacent scintillator crystals. As illustrated in FIG. 1, the reflecting plates RX and RY are structured from plastic film such as, for example, polyester film, located interposed between mutually adjacent scintillator crystals c, with a thickness of, for example, 125 μm. The reflecting plates RX will be explained first. FIG. 2 is a plan view diagram when a scintillator according to the first embodiment is viewed from the zx side end face thereof. As illustrated in FIG. 2, each of the reflecting plates RX are plate shapes that extend in the y direction and the z direction, where the reflecting plates RX are interposed in the gaps between the scintillator crystals c in the first layer L1. Moreover, the height thereof in the z direction is set at, for example, 4.5 mm. In this way, the reflecting plates RX and each of the layers L1, L2, L3, and L4 have equal dimensions in the height direction. The reflecting plates RX correspond to the reflecting plates that extend in the crosswise direction in the present disclosure, and the reflecting plates RY correspond to the reflecting plates that extend in the lengthwise direction in the present disclosure.

In the first layer L1 and the second layer L2, the reflecting plates RYa that extend in the y direction are interposed in the gaps between the scintillator crystals c. A reflecting plate RYa is interposed between, for example, c(2,1) and c(3,1), from among the 32 scintillator crystals c that are arranged in the x direction. In this way, a scintillator crystal c that is even-numbered in the x direction is positioned adjacent to the reflecting plate RYa on the left, and a scintillator crystal c that is odd-numbered in the x direction is positioned adjacent to the reflecting plate RYa to the right. Each individual reflecting plate RYa is provided spanning the first layer L1 and the second layer L2, and a total of 15 of these are provided in the scintillator 2 as a whole. The reflecting plates RYa not only span the first layer L1 and the second layer L2 of the scintillator 2, but are also arranged at intervals, in the x direction, of two scintillator crystals c. The dimensions of the reflecting plates RYa in the z direction are set to, for example, 9 mm. In this way, the dimension in the height direction of the reflecting plates RYa is equal to the total height of the first layer L1 and the second layer L2.

Similarly, in the third layer L3 and the fourth layer L4, the reflecting plates RYb that extend in the y direction are interposed in the gaps between the scintillator crystals c. However, the positions at which they are interposed are different from those of the reflecting plates RYa. That is, a scintillator crystal c that is odd-numbered in the x direction is positioned adjacent to the reflecting plate RYb on the left, and a scintillator crystal c that is even-numbered in the x direction is positioned adjacent to the reflecting plate RYb to the right. Each individual reflecting plate RYb is provided spanning the third layer L3 and the fourth layer L4, and a total of 16 of these are provided in the scintillator 2 as a whole. The reflecting plates RYb not only span the third layer L3 and the fourth layer L4 of the scintillator 2, but are also arranged at intervals, in the x direction, of two scintillator crystals c. The dimensions of the reflecting plates RYb in the z direction are set to, for example, 9 mm. In this way, the dimension in the height direction of the reflecting plates RYb is equal to the total height of the first layer L1 and the second layer L2.

Figure 3:
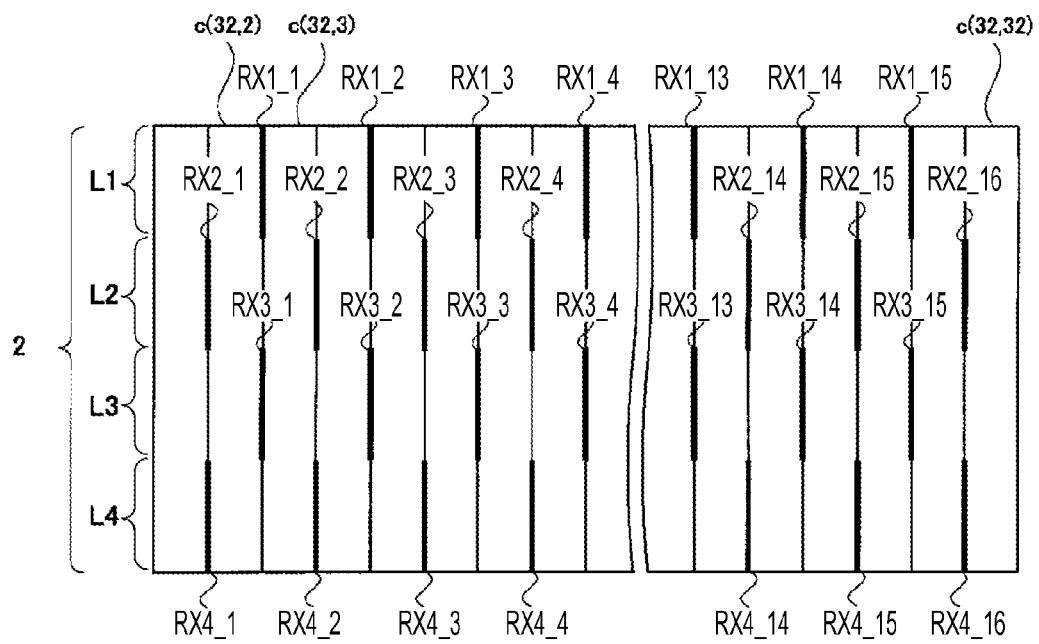
FIG. 3 is a plan view diagram for explaining the structure of a scintillator according to the first embodiment.

The side end face on the yz side of a scintillator according to the present embodiment will be explained next. FIG. 3 is a plan view diagram when a scintillator according to the first embodiment is viewed from the yz side end face thereof. As illustrated in FIG. 3, reflecting plates RX that extend in the x direction are interposed in the gaps between the scintillator crystals c in each of the layers. Moreover, the height thereof in the z direction is set at, for example, 4.5 mm. All of the reflecting plates RX are plate shapes, extending in the x direction and the z direction.

The reflecting plates RX1 are reflecting plates that are interposed in the gaps between the scintillator crystals c in the first layer L1 and the reflecting plates RX2 are reflecting plates that are interposed in the gaps between the scintillator crystals c in the second layer L2. Moreover, a reflecting plate RX1 is interposed between, for example, c(32,2) and c(32,3), from among the 32 scintillator crystals c that are arranged in the x direction. In this way, a scintillator crystal c that is even-numbered in the y direction is positioned adjacent to the reflecting plate RX1 on the left, and a scintillator crystal c that is odd-numbered in the y direction is positioned adjacent to the reflecting plate RX1 to the right. On that hand, in the respective scintillator crystal layers the reflecting plates RX2 are interposed in positions that are different from those of the reflecting plates RX1. That is, a scintillator crystal c that is odd-numbered in the y direction is positioned adjacent to the reflecting plate RX2 on the left, and a scintillator crystal c that is even-numbered in the y direction is positioned adjacent to the reflecting plate RX2 to the right. It is noted that 15 of these reflecting plates RX1 are provided in the first layer L1 and 16 of these reflecting plates RX2 are provided in the second layer L2. In this way, the reflecting plates RX1 and RX2 are arranged with a spacing equal to that of a single scintillator crystal c, in the y direction, so as to appear alternatingly in the first layer L1 and the second layer L2 of the scintillator 2. The dimension of the reflecting plate RX1 in the height direction is equal to the height of the first layer L1, and the dimension of the reflecting plate RX2 in the height direction is equal to the height of the second layer L2.

The reflecting plates RX3 are reflecting plates that are interposed in the gaps between the scintillator crystals c in the third layer L3, where the locations at which the reflecting plates RX3 are inserted into the scintillator 2 are the same as those of the reflecting plates RX1. Similarly, the reflecting plates RX4 are reflecting plates that are interposed in the gaps between the scintillator crystals c in the fourth layer L4, where the locations at which the reflecting plates RX4 are inserted into the scintillator 2 are the same as those of the reflecting plates RX2. That is, a scintillator crystal c that is even-numbered in the y direction is positioned adjacent to the reflecting plate RX3 on the left, and a scintillator crystal c that is odd-numbered in the y direction is positioned adjacent to the reflecting plate RX3 to the right. Moreover, a scintillator crystal c that is odd-numbered in the y direction is positioned adjacent to the reflecting plate RX4 on the left, and a scintillator crystal c that is even-numbered in the y direction is positioned adjacent to the reflecting plate RX4 to the right. It is noted that 15 of these reflecting plates RX3 are provided in the third layer L3 and 16 of these reflecting plates RX4 are provided in the fourth layer L4. In this way, the reflecting plates RX3 and RX2 are arranged with a spacing equal to that of a single scintillator crystal c, in the y direction, so as to appear alternatingly in the third layer L3 and the fourth layer L4 of the scintillator 2. The dimension of the reflecting plate RX3 in the height direction is equal to the height of the third layer L3, and the dimension of the reflecting plate RX4 in the height direction is equal to the height of the fourth layer L4.

(4) The Reflecting Plate Lattices: The Most Distinctive Structures in the Present Disclosure The radiation detector 1 according to the present disclosure is distinctive in regards to its reflecting plate lattices, so this will be explained. The reflecting plate lattice is a lattice-shaped structural object that is structured by fitting together reflecting plates RX that extend in the x direction and reflecting plates RY that extend in the y direction.

Figure 4:
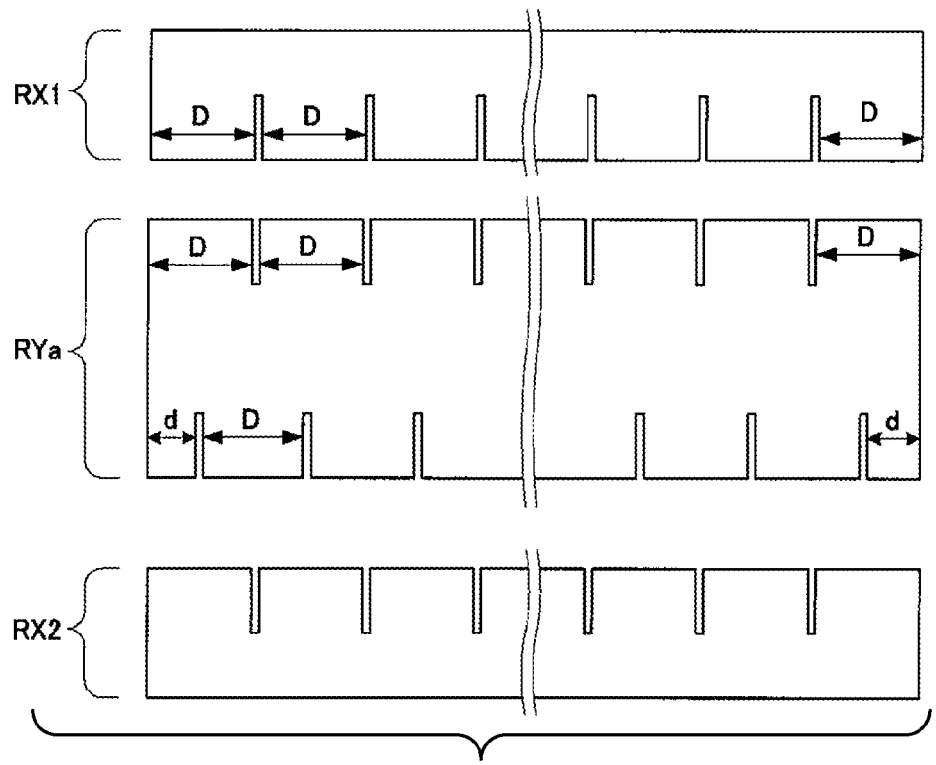
FIG. 4 is a plan view diagram for explaining the structure of a reflecting plate according to the first embodiment.

FIG. 4 is a plan view diagram illustrating the structure of the reflecting plates RX1 that are provided in the first layer L1, the reflecting plates RYa that are provided spanning the first layer L1 and the second layer L2, and the reflecting plates RX2 that are provided in the second layer L2. Slots that extend in the z direction (corresponding to the vertical direction in FIG. 4) are provided in the reflecting plates RX1. These slots are provided for the purpose of fitting the reflecting plates RYa therein, and are provided in a quantity equal to the number of reflecting plates RYa, with a spacing distance D that corresponds to twice the x-direction width of the scintillator crystals c that structure the scintillator 2. Given this, the slots are provided so that openings will appear at one of the two end portions, in the z direction, of the reflecting plates RX1. The z-direction length of the slots is equal to the length of half of the reflecting plate RX1. The distance in the x direction (corresponding to the left/right direction in FIG. 4) in the reflecting plate RX1 from the end portion thereof to the slot that is provided nearest to the end portion is equal to the distance D.

Slots that extend in the z direction (corresponding to the vertical direction in FIG. 4) are provided in the reflecting plates RYa. These slots are provided for the purpose of fitting the reflecting plates RX1 therein, and are provided in a quantity equal to the number of reflecting plates RX1, with a spacing distance D that corresponds to twice the y-direction width of the scintillator crystals c that structure the scintillator 2. Given this, the slots are provided so that openings will appear at one of the two end portions, in the z direction, of the reflecting plates RYa. The z-direction length of the slots is equal to the length of half of the reflecting plate RX1. The distance in the y direction (corresponding to the left/right direction in FIG. 1) in the reflecting plate RYa from the end portion thereof to the slot that is provided nearest to the end portion is equal to the distance D.

Slots that extend in the z direction (corresponding to the vertical direction in FIG. 4) are provided in the reflecting plates RYa into which the reflecting plates RX2 will fit, separate from the slots into which the reflecting plates RX1 will fit. These slots are provided in a quantity equal to the number of reflecting plates RX2, with a spacing distance D that corresponds to twice the y-direction width of the scintillator crystals c that structure the scintillator 2. Given this, the slots are provided so that the openings will appear at end portions the opposite side, in the z direction of the reflecting plates RYa, from the end portions wherein the slots are provided for fitting together with the reflecting plates RX1. The z-direction length of the slots is equal to the length of half of the reflecting plate RX2. The distance d in the y direction (corresponding to the left/right direction in FIG. 1) in the reflecting plate RYa from the end portion thereof to the slot that is provided nearest to the end portion is equal to the y-direction width of a single scintillator crystal c.

Slots that extend in the z direction (corresponding to the vertical direction in FIG. 4) are provided in the reflecting plates RX2. These slots are provided for the purpose of fitting the reflecting plates RYa therein, and are provided in a quantity equal to the number of reflecting plates RYa, with a spacing distance D that corresponds to twice the x-direction width of the scintillator crystals c that structure the scintillator 2. Given this, the slots are provided so that openings will appear at one of the two end portions, in the z direction, of the reflecting plates RX2. The z-direction length of the slots is equal to the length of half of the reflecting plate RX2. The distance in the x direction (corresponding to the left/right direction in FIG. 4) in the reflecting plate RX1 from the end portion thereof to the slot that is provided nearest to the end portion is equal to the distance D.

In the structure explained using FIG. 4, the reflecting plates RX1 and the reflecting plates RX2 are members of identical structures. That is, if the reflecting plates RX1 were turned upside down to reverse top and bottom in FIG. 4, the structure would be identical to that of the reflecting plates RX2.

The result of combining such reflecting plates RX1, RYa, and RX2, through fitting them together, is a reflecting plate lattice Wa. The reflecting plate lattice Wa is formed through fitting together the reflecting plates RX1 and RYa by causing the slots that extend in the z direction that are provided in the reflecting plates RX1 to be coincident with the locations of the slots that extend in the z direction that are provided in the reflecting plates RYa and then fitting the slots together, and by causing the slots that are provided in the reflecting plates RX2 to be coincident with the locations of the slots provided in the reflecting plates RYa, and then fitting them together.

FIG. 5 is a perspective diagram illustrating the reflecting plate lattice Wa that is structured in this way. The reflecting plate lattice Wa has a height of two layers, the first layer L1 and the second layer L2 in the scintillator 2, and is structured through arranging the reflecting plates RYa so as to be equally spaced in the y direction, with a spacing of twice the width of the scintillator crystals c. The reflecting plates RX1 that are provided in the first layer L1 of the reflecting plate lattice Wa are arranged in the x direction with a spacing that is equal to the x-direction width of two scintillator crystals c, and the reflecting plates RX2 that are provided in the second layer L2 are arranged in the x direction with a spacing that is equal to the x-direction width of two scintillator crystals c. Moreover, the reflecting plates RX1 and the reflecting plates RX2 are provided so as to appear alternatingly with spacing equal to the width of a single scintillator crystal c.

FIG. 6 is a plan view diagram illustrating the structure of the reflecting plates RX3 that are provided in the third layer L3, the reflecting plates RYb that are provided spanning the third layer L3 and the fourth layer L4, and the reflecting plates RX4 that are provided in the second layer L2. While the reflecting plates RX3 are structured identically to the reflecting plates RX1, described above, the locations of the slots are different. That is, the distance d in the x direction (corresponding to the left/right direction in FIG. 4) in the reflecting plates RX3 from the end portion thereof to the slot that is provided nearest to the end portion is equal to the x-direction width of a single scintillator crystal c.

The reflecting plates RYb are structured identically to the reflecting plates RYa explained in FIG. 4. Moreover, the reflecting plates RX4 are members that are structured identically to the reflecting plates RX3. That is, if the reflecting plates RX3 were turned upside down to reverse top and bottom in FIG. 6, the structure would be identical to that of the reflecting plates RX4.

The result of combining such reflecting plates RX3, RYb, and RX4, through fitting them together, is a reflecting plate lattice Wb. The reflecting plate lattice Wb is formed through fitting together the reflecting plates RX3 and RYb by causing the slots that extend in the z direction that are provided in the reflecting plates RX3 to be coincident with the locations of the slots that extend in the z direction that are provided in the reflecting plates RYb and then fitting the slots together, and by causing the slots that are provided in the reflecting plates RX4 to be coincident with the locations of the slots provided in the reflecting plates RYb, and then fitting the reflecting plates RX4 and RYb together.

The reflecting plate lattice Wb that is structured in this way has a height of two layers, the third layer L3 and the fourth layer L4 in the scintillator 2, and is structured through arranging the reflecting plates RYb so as to be equally spaced in the y direction, with a spacing of twice the width of the scintillator crystals c. The reflecting plates RX3 that are provided in the third layer L3 of the reflecting plate lattice Wb are arranged in the x direction with a spacing that is equal to the x-direction width of two scintillator crystals c, and the reflecting plates RX4 that are provided in the fourth layer L4 are arranged in the x direction with a spacing that is equal to the x-direction width of two scintillator crystals c. Moreover, the reflecting plates RX3 and the reflecting plates RX4 are provided so as to appear alternatingly with spacing equal to the width of a single scintillator crystal c.

In this way, the scintillator 2 is provided with two reflecting plate lattices Wa and Wb, stacked in the z direction. the scintillator crystals c that structure the scintillator 2 are arranged in the lengthwise and crosswise directions so as to fill the individual partitions that are formed by the reflecting plates RX and RY that structure the reflecting plate lattices Wa and Wb.

<Fluorescence Emission Location Discriminating Method>

The method for discriminating the location of emission of the fluorescence in the x, y, and z directions in the radiation detector 1 according to the first embodiment will be explained next. A γ ray that is incident into the scintillator 2 is converted into fluorescence in one of four regions. This fluorescence advances in the direction of the light guide 4, and is incident into the PMT 3 through the light guide 4. The PMP 3 is of a multiple-anode, and is structured so that the voltage of the detection signal, which is outputted depending on the location of incidence, changes in a stepwise manner. In this way, it is possible to identify the locations, in the x and y directions, of the fluorescence that is incident into the PMT.

The method for identifying the location of emission of the fluorescence in the z direction of the radiation detector will be explained referencing FIG. 7 and FIG. 8. As illustrated in FIG. 7 and FIG. 8, in the four regions of the scintillator 2, the locations in which the reflecting plates RX and the reflecting plates RY are interposed are mutually different. Using FIG. 7 and FIG. 8 to look at the scintillator crystal c(2,2) that is located at (2,2), indicated by the diagonal lines in FIG. 7 and FIG. 8, the directions wherein the reflecting plates RX and RY are interposed in the four regions are mutually different. The fluorescence that is produced by a scintillator crystal c arrives at the PMT 3 while expanding in the x and y directions, but the provision of the reflecting plates RX and RY applies directionality to the expansion. Furthermore, if fluorescence produced in the individual layers the L1, L2, L3, and L4 at identical x, y locations were to be compared, the directions in which the spreading occurs will be mutually different. That is, the differences in the fluorescence emission location in the z direction of the scintillator 2 are converted into differences in the x, and y directions of the fluorescence. The PMT 3 is able to detect small shifts of the fluorescence in the x, y directions arising from differences in the locations in the z direction, and the individual layer L1, L2, L3, or L4 that is the location, in the z direction, from which the fluorescence is emitted can be identified thereby.

<Effects Obtained through The Structures in the Present Disclosure>

Multiple effects can be produced through the use of the structure having the two reflecting plate lattices Wa and Wb in the scintillator 2 that has four layers, as in the present disclosure. These effects will be explained in order.

<Effect of the Present Disclosure: Simplification of Stacking of the Reflecting Plate Lattices>

With the scintillator 2 according to the present disclosure, the assembly is simplified when compared to the conventional structure having individual reflecting plate lattices for each of the four layers. Firstly, with the conventional structure it is necessary to stack, in four layers, the respective reflecting plate lattices that have been assembled individually, and then to arrange the scintillator crystals c so as to fill each of the partitioned spaces that are formed by the reflecting plate lattices. In the conventional structure, merely stacking the reflecting plate lattices four-high is difficult to begin with. In contrast, with the structure of the present embodiment there are only two reflecting plate lattices to be stacked, making the stacking of the reflecting plate lattices easier.

Moreover, with the subject matter according to the present disclosure, it is possible to reduce the number of reflecting plates that are required when manufacturing the scintillator 2. That is, the reflecting plates RY according to the present disclosure are structured so as to combine what is two reflecting plates in the conventional structure. Consequently, in the present disclosure, what has required two reflecting plates conventionally can be replaced by a single reflecting plate RY. Consequently, the subject matter according to the present disclosure enables the manufacturing of the scintillator 2 with fewer parts than has been conventional, enabling streamlining of the manufacturing of the scintillator 2, when compared to that which is conventional.

<Effect of the Present Disclosure: Precise Placement of the Reflecting Plates>

Moreover, the subject matter according to the present disclosure enables the reflecting plates to be arranged with precision. FIG. 9 and FIG. 10 are for explaining the reason for this. When the reflecting plate lattices are to be stacked, the reflecting plates in one of the reflecting plate lattices make contact with the reflecting plates belonging to the other reflecting plate lattice. This contact can come in two types.

FIG. 9 illustrates one of the types of contact. As illustrated on the left side in FIG. 9, when reflecting plates contact each other mutually perpendicularly, the reflecting plates cross, as illustrated on the right side in FIG. 9. In this state, the top reflecting plate is supported by a point on the bottom reflecting plate, where the location on the reflecting plates is determined uniquely. When stacking reflecting plate lattices, this type of contact is preferred.

FIG. 10 shows the other type of contact. In the case wherein mutually parallel reflecting plates contact each other, as illustrated on the left side of FIG. 10, the stacking, as illustrated on the right side in FIG. 10, does not go well, as it does in FIG. 9. In the case in FIG. 10, the top reflecting plate is supported by a line on the bottom reflecting plate. When this is done, there only needs to be support on one point on the line, even if the top reflecting plate lattice is not supported on an entire line. The result is that it is possible for the top supporting plate to be misaligned relative to the bottom supporting plate, because the locations of the supporting plates are not defined uniquely. When stacking supporting plate lattices, this type of contact should be avoided.

In the present disclosure, the type of contact illustrated in FIG. 9 occurs when stacking the two reflecting plate lattices. Consequently, the reflecting plate lattices are stacked together in a state wherein the correct positional relationship is maintained without misalignment. On the other hand, in the conventional structure, the type of contact illustrated in FIG. 10 occurs when stacking the reflecting plate lattices in four layers. Consequently, with the conventional structure, stacking the four layers of reflecting plate lattices with good precision is difficult.

In the scintillator 2, when reflecting plates are inserted at the correct locations, that alone causes the fluorescence to be detected by the PMT 3 in the ideal state. Consequently, the present disclosure enables the provision of a radiation detector 1 with improved spatial resolution.

<Effect of the Present Disclosure: Simplification of Insertion of the Scintillator Crystals c>

Moreover, the structure according to the present disclosure causes the manufacturing of the scintillator 2 to be easier for another reason, in addition to the ease of stacking the reflecting plate lattices Wa and Wb. Specifically, the insertion of the scintillator crystals c into the stacked reflecting plate lattices Wa and Wb is easier.

The left-hand side of FIG. 11 shows the state wherein the scintillator crystals c are loaded into the two-layer stack of the reflecting plate lattices Wa and Wb. At this time, the scintillator crystals c are inserted into the reflecting plate lattices Wa and Wb while in contact with the reflecting plates RYa and RYb. The right-hand side of FIG. 11 shows the state wherein, when inserting a scintillator crystal c, the scintillator crystal c is slid downward while a side face of the scintillator crystal c maintains contact with a reflecting plate RYa. The reflecting plate RYa has a smooth face, without indentations and protrusions, so the scintillator crystal c that is inserted slides downward smoothly without catching on the reflecting plate RYa.

In contrast, with a scintillator 2 of the conventional structure, insertion of the scintillator crystal c into the reflecting plate lattices is difficult. The left-hand side in FIG. 12 shows the state wherein the scintillator crystals c are loaded into the four-layer stack of reflecting plate lattices W1, W2, W3, and W4. At this time as well, the scintillator crystal c is inserted into the reflecting plate lattices W1, W2, W3, and W4 while in contact with the reflecting plates. The right-hand side in FIG. 12 shows the state wherein, when inserting a scintillator crystal c, the scintillator crystal c is slid downward while a side face of the scintillator crystal c maintains contact with a reflecting plate. With the conventional structure, the structure has two reflecting plates that abut each other in the z direction, instead of the reflecting plate RYa according to the present disclosure. Consequently, in the scintillator 2 according to the conventional structure, there will be a gap between the reflecting plates that abut each other in the z direction. This gap makes insertion of the scintillator crystal c difficult.

The scintillator plates are manufactured through cutting sheet plastic material. Consequently, the edges of the reflecting plates will curl as illustrated in the right-hand side of FIG. 12. Because of this, barbs (right side of FIG. 12) will be produced by the curling of the reflecting plates at the gap between the reflecting plates of the conventional structure. The scintillator crystal c that is being inserted catches on this barb, preventing it from sliding in smoothly.

With the subject matter of the present disclosure, the number of reflecting plates that structure the reflecting plate lattices is reduced extremely, reducing the number of barbs that appear at the edge portions of the reflecting plates that are included in the reflecting plate lattices, when compared to the conventional structure. As a result, the invention according to the present disclosure causes the insertion of the scintillator crystals c, when manufacturing the scintillator 2, to be easier than with the conventional structure.

<Effect of the Present Disclosure: Reduction of Reflection Loss>

With the scintillator 2 according to the present disclosure, there is no gap between reflecting plates that abut in the z direction. This is because, in the scintillator 2 according to the present disclosure, there are no reflecting plates that abut in the z direction to begin with. Because, in the invention according to the present disclosure, there are no such gaps, this can reduce the reflection loss in the reflecting plate lattices. This effect will be described in detail.

FIG. 13 explains what types of differences there are in the expansion of the fluorescence between the cases wherein there are and are not gaps between reflecting plates that abut in the z direction. The left-hand side of FIG. 13 is for the structure according to the present disclosure. As illustrated in the left-hand side of FIG. 13, the fluorescence that is emitted at the emission point p within the scintillator crystal c is reflected by the reflecting plate RYa while expanding radially. The reflection by this reflecting plate RYa is in the ideal state.

The right-hand side of FIG. 13 shows the conventional structure. As illustrated on the right-hand side of FIG. 13, the fluorescence that is emitted from the emission point p within the scintillator crystal c is reflected by two reflecting plates while expanding radially. At this time, the fluorescence that is incident into the gap between the reflecting plates is not reflected, but rather enters into the adjacent scintillator crystal c. Needless to say, the reflections by these reflecting plates are not ideal.

That is, when compared to that which is conventional, the reflecting plate lattices Wa and Wb according to the present disclosure reflect the fluorescence ideally. The detection precision of the radiation detector 1 can be improved through approaching the ideal reflections of the fluorescence within the scintillator 2 through the use of the reflecting plate lattices Wa and Wb according to the present disclosure.

With the structure as disclosed above, two reflecting plate lattices in the conventional structure are combined into a single reflecting plate lattice Wa. The use of such a structure simplifies manufacturing of the scintillator 2. That is, the radiation detector 1 according to the present disclosure reduces the number of reflecting plate lattices that are stacked when manufacturing the scintillator 2, enabling the scintillator 2 to be manufactured easily. Moreover, because the number of reflecting plate lattices that must be manufactured is reduced, this reduces commensurately the number of components required when manufacturing the scintillator 2. Consequently, the subject matter according to the present disclosure enables the scintillator 2 to be manufactured more easily than with the conventional structure, enabling the provision of an inexpensive radiation detector 1.

Furthermore, given the present disclosure, the two reflecting plate lattices of the conventional structure are combined together. There is no leeway for positional misalignment between the reflecting plate lattices that have been integrated together. Consequently, the subject matter according to the present disclosure enables structuring of a scintillator wherein the reflecting plate lattices Wa and Wb are positioned more precisely, enabling the provision of a radiation detector with higher detection accuracy.

Moreover, the subject matter of the present disclosure makes it possible to insert the scintillator crystals c easily into the reflecting plate lattices Wa and Wb when manufacturing the scintillator 2. This is because the integration of what, in the conventional structure, is two reflecting plate lattices keeps the scintillator crystals c from catching at the joints between reflecting plate lattices.

Furthermore, the subject matter according to the present disclosure enables the structuring of reflecting plate lattices Wa and Wb having ideal reflection characteristics. This is because the integration of what, in the conventional structure, is two reflecting plate lattices does not produce a phenomenon wherein the fluorescence is not reflected at the joints between reflecting plate lattices.

The present subject matter is not limited to the structure set forth above, but rather may be embodied with modifications such as described below.

(1) In addition to the structure in the first embodiment, the present subject matter may be provided with a structure such that there will be no positional misalignment between the reflecting plate lattices Wa and Wb. That is, as illustrated in FIG. 14, notches may be provided in the reflecting plates RYa that belong to the reflecting plate lattice Wa, and the reflecting plates RX3 that belong to the reflecting plate lattice Wb may be inserted into these notches. When this is done, the reflecting plate lattices Wa and Wb will fit together with the reflecting plates RX3 in the notches when the reflecting plate lattices Wa and Wb are stacked when manufacturing the scintillator 2. As a result, there will be no positional misalignment between the stacked reflective plate lattices, making the subject matter of the scintillator crystals c easier.

FIG. 15 explains in particular the notches that are provided in the reflecting plates RYa. The notches are provided on the end portion sides of those reflecting plates RYa that are provided with the slots for fitting with the reflecting plates RX2, where the distance d between the slot for fitting with the reflecting plates RX2 and the notch is the size of a single scintillator crystal c. On the reflecting plates RYa, the notches are provided at equal spacing, with the width of two scintillator crystals c. The reflecting plates RYa have the same number of notches as the number of reflecting plates RX3 that structure the reflecting plate lattice Wb. The locations, in the y direction, of the notches that are provided in the reflecting plates RYa are coincident with the locations, in the y direction, of the slots for fitting the reflecting plates RX1.

The provision of notches in the one reflecting plate lattice Wa for fitting the other reflecting plate lattice Wb so that the two reflecting plate lattices Wa and Wb in the scintillator 2 do not become positionally misaligned makes it easier to insert the scintillator crystals c when manufacturing the scintillator 2.

(2) Similarly, notches may be provided in the reflecting plates RYb that belong to the reflecting plate lattice Wb, and the reflecting plates RX2 that belong to the reflecting plate lattice Wa may be inserted into these notches. FIG. 16 explains in particular the notches that are provided in the reflecting plates RYb. The notches are provided on the end portion sides of those reflecting plates RYb that are provided with the slots for fitting with the reflecting plates RX2, where the distance d between the slot for fitting with the reflecting plates RX2 and the notch is the size of a single scintillator crystal c. On the reflecting plates RYb, the notches are provided at equal spacing, with the width of two scintillator crystals c. The reflecting plates RYb have the same number of notches as the number of reflecting plates RX2 that structure the reflecting plate lattice Wa. The locations, in the y direction, of the notches that are provided in the reflecting plates RYb are coincident with the locations, in the y direction, of the slots for fitting the reflecting plates RX4.

(3) Similarly, notches may be provided in the reflecting plates RX2 that belong to the reflecting plate lattice Wa, and the reflecting plates RYb that belong to the reflecting plate lattice Wb may be inserted into these notches. FIG. 17 explains in particular the notches that are provided in the reflecting plates RX2. The notches are provided on the end portion sides of those reflecting plates RX2 opposite of those and portions that are provided with the slots for fitting with the reflecting plates RYa, where the distance d between the slot for fitting with the reflecting plates RYa and the notch is the size of a single scintillator crystal c. On the reflecting plates RX2, the notches are provided at equal spacing, with the width of two scintillator crystals c. The reflecting plates RX2 have the same number of notches as the number of reflecting plates RYa that structure the reflecting plate lattice Wb.

(4) Similarly, notches may be provided in the reflecting plates RX3 that belong to the reflecting plate lattice Wb, and the reflecting plates RYa that belong to the reflecting plate lattice Wa may be inserted into these notches. FIG. 18 explains in particular the notches that are provided in the reflecting plates RX3. The notches are provided on the end portion sides of those reflecting plates RX3 opposite of those and portions that are provided with the slots for fitting with the reflecting plates RYa, where the distance d between the slot for fitting with the reflecting plates RYa and the notch is the size of a single scintillator crystal c. On the reflecting plates RX3, the notches are provided at equal spacing, with the width of two scintillator crystals c. The reflecting plates RX3 have the same number of notches as the number of reflecting plates RYa that structure the reflecting plate lattice Wa.

(5) While the four layers in the scintillator 2 according to the first embodiment all have the same widths, the present disclosure is not limited thereto. As illustrated in FIG. 19, the structure may also be one wherein the widths of the four layers are different.

(6) While the scintillator crystals c in the first embodiment were provided spanning the four layers of the scintillator, the present disclosure is not limited thereto. Instead, as illustrated in FIG. 20, the structure may be one wherein there are separate scintillator crystals c for each of the first layer L1 through fourth layer L4 of the scintillator 2.

(7) The light guide 4 in the present disclosure is not imperative, but instead the structure may be one wherein the scintillator 2 and the PMT 3 are coupled directly.

(8) The third layer L3 and the fourth layer L4 of the scintillator 2 may be structured as conventionally, or the first layer L1 and the second layer L2 of the scintillator 2 may be structured as conventionally.

(9) The fluorescence detecting device in the present disclosure need not necessarily be a PMT, but rather an SiPM may be used instead of the PMT.

(10) The structure of the invention according to the present disclosure may be one wherein, two or more of the modified examples (1) through (9), set forth above, are provided. Moreover, the structure may be one wherein all of the modified examples set forth above are provided.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A radiation detector comprising:
   a scintillator, wherein scintillator crystals for converting radiation into the fluorescence are arranged in the crosswise and lengthwise directions of the scintillator, and wherein a first, second, third and fourth layer are arranged in the height direction of the scintillator; and
   a plurality of reflecting plates that extend in the crosswise direction or the lengthwise direction, for reflecting the fluorescence, in the gaps between mutually adjacent scintillator crystals, wherein:
   reflecting plates that extend in the crosswise direction are arranged in the lengthwise direction with spacing equal to the size of one scintillator crystal so as to alternate between the first layer and the second layer of the scintillator,
   reflecting plates that extend in the lengthwise direction are arranged spanning the first layer and the second layer of the scintillator and with spacing equal to the size of two scintillator crystals in the crosswise direction, and
   the reflecting plates that extend in the crosswise direction and the reflecting plates that extend in the lengthwise direction are fitted together to structure a reflecting plate lattice that has the same height as two layers of the scintillator.

2. The radiation detector as set forth in claim 1, further comprising:
   a plurality of reflecting plates extending in the crosswise direction and the lengthwise direction in the third layer and the fourth layer of the scintillator , wherein:
   reflecting plates extending in the crosswise direction are arranged in the lengthwise direction with spacing equal to the size of one scintillator crystal so as to alternate between the third layer and the fourth layer of the scintillator,
   reflecting plates extending in the lengthwise direction are arranged spanning the third layer and the fourth layer of the scintillator and with spacing equal to the size of two scintillator crystals in the crosswise direction, and
   the reflecting plates that extend in the crosswise direction and the reflecting plates that extend in the lengthwise direction are fitted together to structure a reflecting plate lattice that has the same height as two layers of the scintillator.

3. The radiation detector as set forth in claim 2, wherein notches, into which the reflecting plates that extend in the crosswise direction in the third layer of the scintillator are inserted, are provided in the reflecting plates that extend in the lengthwise direction that are provided spanning the first layer and the second layer of the scintillator.

4. The radiation detector as set forth in claim 2, further comprising:
   notches, into which the reflecting plates that extend in the crosswise direction in the second layer of the scintillator are inserted, are provided in the reflecting plates that extend in the lengthwise direction that are provided spanning the third layer and the fourth layer of the scintillator.

5. The radiation detector as set forth in claim 2, further comprising:
   notches, into which the reflecting plates that extend in the lengthwise direction that span the third layer and the fourth layer of the scintillator are inserted, are provided in the reflecting plates that extend in the crosswise direction that are provided in the second layer of the scintillator.

6. The radiation detector as set forth in claim 2, further comprising:
   notches, into which the reflecting plates that extend in the lengthwise direction that span the first layer and the second layer of the scintillator are inserted, are provided in the reflecting plates that extend in the crosswise direction that are provided in the third layer of the scintillator.

7. The radiation detector as set forth in claim 6, wherein the scintillator crystals are provided spanning the first layer through the fourth layer of the scintillator.

8. The radiation detector as set forth in claim 6, wherein scintillator crystals are provided individually in each of the first layer through fourth layer of the scintillator.

9. The radiation detector as set forth in claim 8, further comprising:
- a photodetector for detecting fluorescence, connected optically to the scintillator.

10. The radiation detector as set forth in claim 1, wherein:
- slots that extend in the height direction are provided in the reflecting plates that extend in the crosswise direction and the reflecting plates that extend in the lengthwise direction; and
- the reflecting plate lattice is structured so that the slots provided in the reflecting plates that extend in the crosswise direction and the slots in the reflecting plates that extend in the lengthwise direction fit together.

\* \* \* \* \*